May 13, 1924.
M. C. OVERMAN
MEANS FOR SECURING TIRES TO WHEELS
Filed Sept. 25, 1919
1,494,124
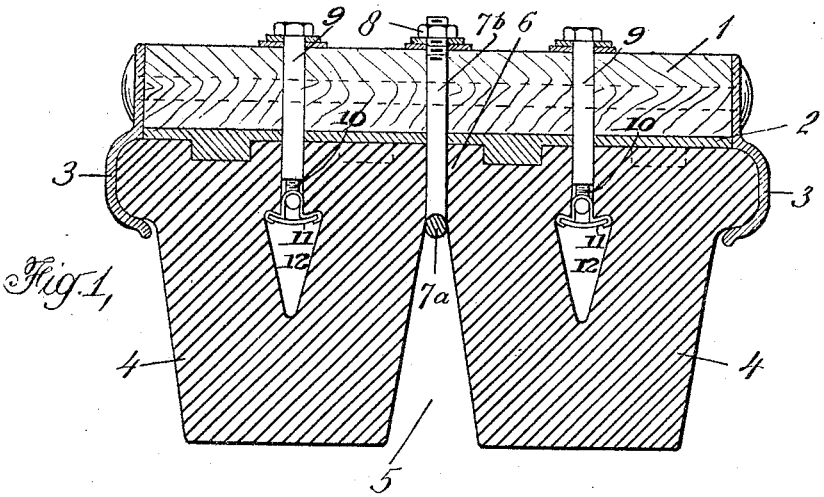
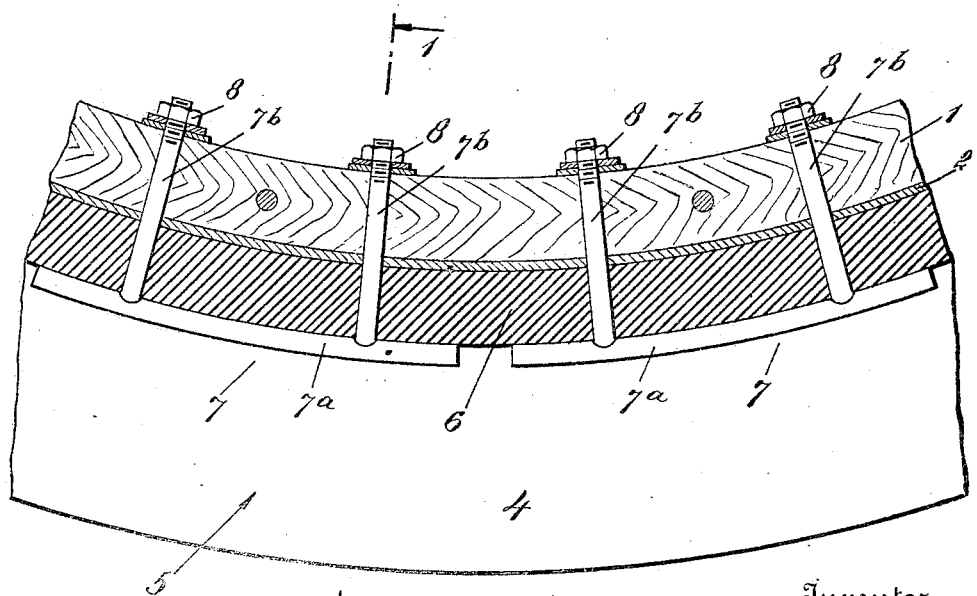
Inventor
Max Cyrus Overman
By his Attorney Patented May 13, 1924.

1,494,124

UNITED STATES PATENT OFFICE.

MAX CYRUS OVERMAN, OF NEW YORK, N. Y.

MEANS FOR SECURING TIRES TO WHEELS.

Application filed September 25, 1919. Serial No. 326,206.

*To all whom it may concern:*

Be it known that I, MAX CYRUS OVERMAN, a citizen of the United States, residing at New York, N. Y., have invented certain new and useful Improvements in Means for Securing Tires to Wheels, of which the following is a specification.

My present invention relates to means for securing tires to wheels, especially so-called dual tires, the features and advantages of which will be understood by those skilled in the art from an understanding of the following description in connection with the drawings.

In these, showing one of the possible embodiments my invention is adapted to take, Fig. 1 is a cross-section through a wheel-felly and tire equipped with one of the embodiments my securing-means is adapted to take, said cross-section being taken on the line 1—1 in Fig. 2 looking in the direction of the arrows; and Fig. 2 is a longitudinal mid-section through the felly and base of the tire, showing a plurality of the securing-means in elevation, also the lower part of one-half of the tire in elevation.

I will now describe the specific devices of the drawings together with my present improvements.

1 is the wooden wheel-felly surrounded by the metal felly-band or rim 2. 3—3 are the flanges bolted to the sides of the felly.

The dual tire may be of any usual or preferred construction and therefore I have omitted the details of the tire. The parts 4—4 of the tire are separated by a circumferential cleft 5 but are integrally united by a base-portion 6 which they share in common.

This base portion at said cleft is secured to the felly by a plurality of securing means 7—7. Each of these consists of a metal rod 7ª having a pair of spaced legs 7ᵇ—7ᵇ integral therewith, the legs being located so that the ends of the rod extend well beyond or overhang the legs. When in position, the rods are located lengthwise in the cleft 5 with their legs extending radially inwardly toward the center of the wheel through suitably spaced holes provided for the purpose through the tire-base 6, the felly-band 2, and felly 1. The extremities of the legs are threaded and project beyond the felly where they are provided with washers and nuts 8. The rods 7ª are bent to conform with the curvature of the tire. Tightening the nuts 8 will obviously draw the rods 7ª towards the felly to clamp and secure the base of the tire against the felly.

The fact that each rod has a plurality of legs prevents the rods from working laterally in the cleft of the tire. Their overhanging ends enable the ends of adjacent rods to be brought near together without bringing the holes in the tire and felly close together, to do which would impair the strength of said parts. Altogether the described securing means excellently serve their purpose.

The lateral parts 4 of the tire may be provided with any suitable means for securing them to the wheel felly, but it is preferable to employ for this purpose bolts 9 which extend radially through the wheel felly at suitable intervals circumferentially thereof, the inner ends of these bolts engaging threaded studs 10 connected to plates 11, which latter are contained in hollows 12 formed in the respective lateral parts of the tire, tightening of the bolts serving to draw the bases of the respective lateral parts of the tire against the felly. The hollows 12 in the respective lateral parts of the tire cushion the tread portions of these parts and it will be understood that this cushioning action takes place without loosening or otherwise disturbing the hold produced and maintained on the tire by the tire-securing rods 7ª, owing to the location of these tire-securing rods 7ª between the hollows and in close proximity to the wheel felly, so that these securing rods 7ª act on the base portion of the tire which integrally connects the lateral parts of the tire.

I am aware that changes and modifications may be made in the foregoing which will nevertheless be within the spirit of the foregoing disclosure and within the spirit of the annexed claims, and which as such are accordingly intended to be covered thereby.

I claim—

1. In combination, a wheel felly, a dual tire whose lateral parts are separated by a continuous circumferential cleft but have an integral base portion which joins said adjacent lateral parts, a plurality of segmental tire securing means each comprising a rod located longitudinally in the circumferential cleft and against said integral base portion of the tire, each rod having a pair of circumferentially spaced legs secured thereto and extending through suitably spaced holes in the base portion of the tire and the wheel felly, and means coacting with the free ends of said legs for clamping the base portion of the tire between the rods and the felly.

2. In combination, a wheel felly, a dual tire whose lateral parts are separated by a circumferential cleft but have an integral base portion which joins said adjacent lateral parts, devices for individually securing said lateral parts of the tire to the felly, a plurality of segmental tire securing means each comprising a curved rod located longitudinally in the cleft and bearing against said integral base portion of the tire, each rod having a pair of circumferentially spaced legs extending through correspondingly spaced holes in said base portion of the tire and the wheel felly, and means coacting with the free ends of said legs for clamping the base portion of the tire between the rods and the felly.

3. In combination, a wheel felly, a dual tire whose lateral parts are separated by a continuous circumferential cleft but have an integral base portion which joins the adjacent lateral parts, a plurality of tire securing means each comprising a curved rod located longitudinally in the cleft and bearing against said integral base portion of the tire, each rod having a pair of circumferentially spaced legs extending radially through suitably spaced holes in said base portion of the tire and the wheel felly, each of said rods having tire securing ends which overhang the legs of the rods in a direction circumferentially of the tire and each rod being curved to conform substantially with the circumferential curvature of the base portion of the tire, and means coacting with the free ends of the legs of each rod for clamping the base portion of the tire between the rods and the felly.

MAX CYRUS OVERMAN.